UNITED STATES PATENT OFFICE.

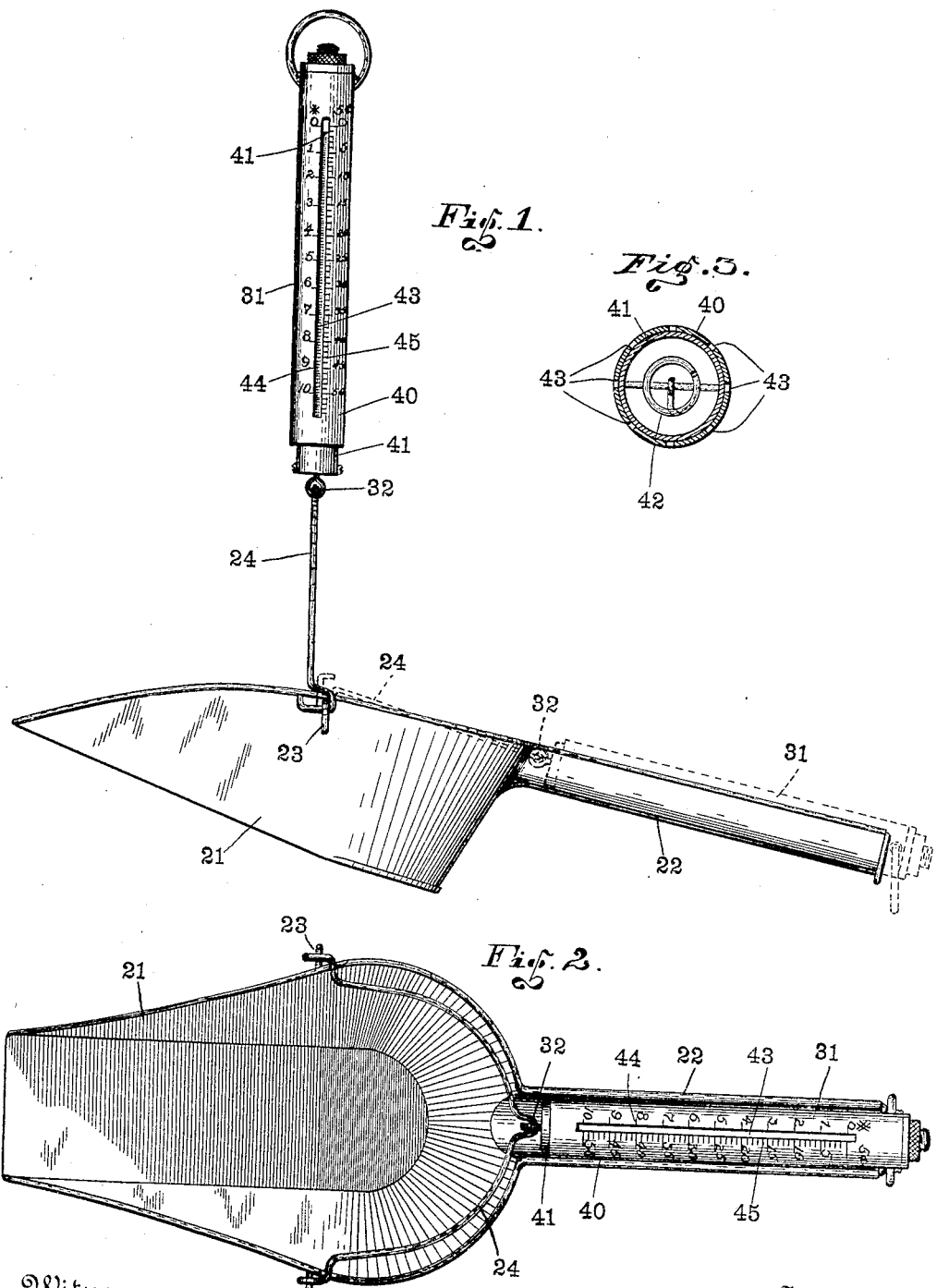

EDWARD L. HEIZER AND ALEXANDER L. HEIZER, OF ANDERSON, INDIANA.

WEIGHING-SCOOP.

No. 817,974.

Specification of Letters Patent.

Patented April 17, 1906.

Application filed May 11, 1905. Serial No. 259,961.

*To all whom it may concern:*

Be it known that we, EDWARD L. HEIZER and ALEXANDER L. HEIZER, citizens of the United States, residing at Anderson, in the county of Madison and State of Indiana, have invented certain new and useful Improvements in Weighing-Scoops, of which the following is a specification.

It is the object of our present invention to provide a convenient device for handling and weighing small quantities of goods (such as fine groceries and the like) which shall always be in place and ready for use.

Said invention consists, in the combination with a scoop, of a scale suitably attached thereto, the construction and arrangement being such that the scoop when loaded may hang in holding position on the scale and the scale may be folded down into and practically become a part of the handle when the utensil is used as a scoop.

The accompanying drawings illustrate a utensil embodying our present invention.

In said drawings, Figure 1 is a side elevation of a scoop and scale in the position which they occupy when the scoop is loaded and its contents being weighed by means of the scale, the folded-down position of the scale being indicated by means of dotted lines; Fig. 2, a top or plan view of the scoop and scale when in the last-mentioned position, and Fig. 3 a section on line 3 3 of Fig. 1.

The scoop 21 is made of any ordinary or desired construction. It is provided with a handle 22, which is preferably semicylindrical in form in order to partially receive the body of the scale (which is preferably of the spring-balance variety) when the same is folded down. At a point somewhat forward of the center of gravity are bail-ears 23, which are securely attached to the sides of the scoop. To these a bail 24 is connected, and said bail is so formed and bent at the points where it unites with the scoop as to hold said scoop when it is suspended by said bail in substantially the position shown in Fig. 1—that is, the ears being attached at a point somewhat forward of the center of gravity and the greatest weight being therefore behind said ears the bail is bent inward over the upper edge of the scoop, (as clearly shown in Figs. 1 and 2,) so as to lock with the scoop when it has reached the position shown in Fig. 1, thus preventing said scoop from tipping down farther, notwithstanding it is heavier upon one side of the ears than upon the other, so that said scoop is maintained in position free of contact with the hand of the operator during the operation of weighing.

The scale 31 is or may be of any ordinary or desired construction, being preferably of the spring-balance variety, as shown, and is connected to the bail 24 in any appropriate way, as by an eye 32. It is adapted to be suspended by any appropriate means during the operation of weighing and to be folded down into (and practically form a part of) the handle, as shown, when the utensil is to be used as a scoop in the ordinary way.

In practice we prefer a scale 31, which consists of a pair of tubular telescoping members 40 and 41, which are connected in the usual well-known manner by an internal spring 42. The external member 40, however, is provided with a plurality of longitudinal slots 43, each edge of which is flanked with a graduated scale, (either avoirdupois or value.) In Fig. 1 we show one of the slots 43 flanked on one side with a series of pound graduations 44 and on the other side with a series of graduations 45, indicating a measure of value at five cents per pound. The upper end of the internal member 41, as indicated in Fig. 1, is visible through any one of the slots 43, and thus serves as an indicator with relation to any series of graduations.

We claim as our invention—

1. The combination of a scoop, having a semicylindrical handle, ears on the sides of the scoop upon the opposite side of the center of gravity thereof from the handle, a bail pivotally attached to said ears and provided with stopping means for engaging the scoop to prevent a downward swing of the handle end of the scoop beyond a predetermined point, and a scale attached to said bail and adapted to fold down into the cavity of the handle.

2. The combination with a scoop, of a weighing-scale adapted to support the same, said scale consisting of a pair of telescoping members, the external one of which is provided with a plurality of longitudinal slots through which the internal member may be seen, and a series of graduations flanking each of said slots.

In witness whereof we have hereunto set our hands and seals, at Anderson, Indiana, this 6th day of May, A. D. 1905.

EDWARD L. HEIZER. [L. S.]
   ALEXANDER L. HEIZER. [L. S.]

Witnesses:
 WILLIAM F. EDWARDS,
 JOHN B. COLVIN.